3,298,799
BORANE-HYDRAZINE COMPOUNDS
William V. Hough, Valencia, and Joseph S. Hashman, Evans City, Pa., assignors to Callery Chemical Company, Pittsburgh, Pa., a corporation of Pennsylvania
No Drawing. Filed Apr. 15, 1959, Ser. No. 806,728
7 Claims. (Cl. 23—358)

This invention relates to new addition compounds of higher boranes and their derivatives with hydrazine and its derivatives and to methods for their preparation.

It is an object of this invention to provide new and useful hydrazine-borane adducts and methods of their preparation. Another object is to provide a method of reacting boranes and hydrazines to produce new and useful compounds. A further object is to provide new monopropellent compositions and methods of their preparation. A still further object is to provide new and useful high energy fuels and methods of their preparation.

According to this invention a higher borane, i.e., a higher boron hydride or a derivative of a higher boron hydride, is combined by chemical reaction with a hydrazine, i.e. hydrazine or a derivative of hydrazine, under controlled conditions to form a family of new compounds. The term higher boron hydride as used herein refers to boron hydrides having 3 or more boron atoms per molecule. The reactants will combine in varying proportions, and by proper selection of the reactant species, reactant proportions, and reaction conditions, materials of any desired physical state are produced; e.g., liquid, oils, pastes, taffys, crystals, powders or resins.

A higher borane and a hydrazine may react explosively on contact to form degradation products, predominately boron nitride and hydrogen (and boron carbide with carbon containing derivatives), which are not useful for the purposes of this invention. We have discovered that if a higher borane and a hydrazine are contacted under controlled conditions no explosive reaction occurs, and the reactants combine to form new and useful products.

The reaction can be controlled by contacting the reactants at a temperature below about −20° C. or by contacting the reactants in the presence of a diluent solvent. It is necessary that the reaction be maintained under the controlled conditions until at least one of the reactants is totally consumed; if the reaction mixture is warmed or the solvent is removed prematurely; the entire reaction mixture may be detonated by a localized uncontrolled reaction.

The reaction must be performed in the absence of air and moisture since the reactants can form explosive mixtures with air, and react with moisture to form localized hot spots which could cause detonation of reaction mixtures. This can be accomplished by using a vacuum, or preferably, an inert (non-oxidizing) cover gas such as nitrogen, argon, or hydrogen.

Any higher boron hydride, or substituted higher boron hydride, containing at least three boron atoms per molecule and at least one B-H bond is suitable for use in this invention. Suitable borane reactants include, for example boron hydrides such as tetraborane(10), $B_4H_{10}$, pentaborane(9), $B_5H_9$, pentaborane(11), $B_5H_{11}$, hexaborane(10), $B_6H_{10}$, decaborane(14), $B_{10}H_{14}$, and dodecaborane(12), $B_{12}H_{12}$; alkyl substituted boron hydrides such as alkylpentaborane(9), $B_5H_{9-x}R_x$, alkyldecaborane(14), $B_{10}H_{14-x}R_x$; acetylenedecaboranes such as acetylenedecarborane, $C_2H_2B_{10}H_{10}$, isopropenylacetylene decaborane, $C_5H_6B_{10}H_{10}$, isopropylacetylenedecaborane, $C_5H_8B_{10}H_{10}$, B-methyl, acetylene decaborane, $$C_2H_2B_{10}H_9CH_3$$

other substituted boranes as for example bisacetonitrilodecaborane $(CH_3CN)_2B_{10}H_{12}$, bis-trimethylaminodecaborane, $[(CH_3)_3N]_2B_{10}H_{12}$, bis-dimethylformidodecabornae, $[(CH_3)_2NCHO]_2B_{10}H_{12}$, and halodecaboranes, $B_{10}H_{14-x}X_x$; addition compounds such as tetrahydrofuran triborane(7), bis-dimethylaminedecaborane, $$[(CH_3)_2NH]_2B_{10}H_{14}$$

decaborane salts such as sodium tridecahydrodecaborate and other organic substituted higher boranes such as the reaction products obtained from the reaction of acetylene and boranes; and mixtures thereof. Some methods of preparing various organic substituted boranes starting materials are described in the following copending applications of common ownership with this application; Edwards and Hough, Ser. No. 571,038, filed March 12, 1958, now Patent No. 2,993,751; Edwards and Hough, Ser. No. 672,573, filed July 18, 1957; Klicker and Chamberlain, Ser. No. 463,586, filed October 20, 1954; Huff and Hunt, Ser. No. 546,822, filed November 14, 1955, abandoned in favor of continuation-in-part application Serial No. 736,437; Huff and Klicker, Ser. No. 429,115, filed May 11, 1954, abandoned in favor of continuation-in-part application Serial No. 692,030, now Patent No. 2,968,540; Schechter and Klicker, Ser. No. 546,819, filed November 14, 1955; Schechter and Wunz, Ser. No. 584,409, filed May 7, 1956.

Hydrazine or any hydrocarbon substituted hydrazine is suitable for use. Suitable hydrazine reactants include hydrazine and alkyl and aryl hydrazines such as mono-, di-, tri-, and tetra-, methyl, ethyl, propyl, and butyl hydrazines, mono- and di- hexyl and cetyl hydrazine, mono-, di-, tri-, and tetra- benzyl hydrazine, and triphenylmethylhydrazine.

Any inert solvent may be used. Aliphatic hydrocarbons aromatic hydrocarbons and ethers have been found particularly satisfactory.

The boron hydrides and substituted boron hydrides form series of compounds with hydrazine and substituted hydrazines, which contain varying proportions of borane constituent and hydrazine constituent. The nature of the reactions and the physical state of the reaction products conforms to the theory that each series of compounds consists of one or more addition products which may be solid or liquid. Further hydrazine constituent may then coordinate with these addition products, somewhat in the manner of the coordination of water in hydrated salts, to form other compounds with modified physical properties.

The compounds of this invention are named as simple adducts; thus for example $N_2H_4 \cdot B_5H_9$ is named hydrazine pentaborane(9); $3CH_3N_2H_3 \cdot B_5H_9$ is named tris-methylhydrazine pentaborane(9); $N_2H_4 \cdot B_5H_8CH_3$ is named hydrazine methylpentaborane(9); $4N_2H_4 \cdot B_5H_9$ is named tetrakishydrazine pentaborane(9); and $$2N_2H_4 \cdot 2CH_3N_2H_3 \cdot B_5H_9$$

is named bis-hydrazine-bis-methylhydrazine pentaborane (9). Other compounds are named in the same manner, thus $2N_2H_4 \cdot C_5H_8B_{10}H_{10}$ is bis-hydrazine isopropenylacetylenedecaborane. This nomenclature is applicable to all the new compounds, although it may be modified to conform with specific structural information. For example, $CH_3N_2H_3 \cdot B_{10}H_{14}$, methyl hydrazine decaborane(14) rearanges to form a salt $CH_3N_2H_4^+B_{10}H_{13}^-$, and may be called methylhydrazinium tridecahydrodecaborate. Physical characteristics and infra-red spectra of a number of the new products of this invention, particularly the substituted decaborane products, indicate that they are polymerica in nature. This is believed due to cross linkages formed by virtue of the dibasic character of the hydrazine constituent. The structure of these polymeric products are not known and they are best named as simple adducts, e.g., the reaction product containing 1 mole of methyl hydrazine to 1 mole of methyldecaborane(10) is designated simply as methylhydrazine methyldecaborane-(10). It has been discovered that both the unsubstituted and the substituted boranes form addition compounds with unsubstituted hydrazine and the substituted hydrazines in different molar proportions in the same manner according to the following disclosure.

The following example is illustrative of the low temperature reaction. 4.4 mmoles of tetraborane and 4.4 mmoles of hydrazine were frozen together in a sealed reaction bulb at −196° C. The mixture was warmed to −23° C. and maintained at that temperature of three hours, and then allowed to warm to room temperature. The solid product in the reaction bulb was a white nonvolatile solid, hydrazine tetraborane(10), of composition $N_2H_4 \cdot B_4H_{10}$.

The low temperature reaction requires several hours to go to completion at about −20° C., and even longer times at lower temperatures. The reaction mixtures may be shock sensitive, so no agitation should be used. The reaction mixture should be warmed slowly from reaction temperature to room temperature to insure complete reaction.

The preferred method of carrying out the reactions of the invention is to contact the reactants in an inert solvent. The solvent acts as a diluent to control the rate of reaction, and thereby prevent explosive reaction. The reaction in a solvent is rapid, goes readily to completion, and the reaction mixture is not shock sensitive. The following example is illustrative of this method. 5 mmoles of pentaborane(9) and 5 mmoles of hydrazine were added to 10 ml. of benzene at room temperatures. A white solid insoluble in benzene was formed immediately. This solid was filtered and vacuum dried and found to be hydrazine pentaborane(9), $N_2H_4 \cdot B_5H_9$.

When weak Lewis base solvents, such as ethers, are used, a different primary addition product may be formed. For example, the primary adduct of monomethylhydrazine and pentaborane(9) in hydrocarbon solvents is tris-methylhydrazine pentaborane(9), $3CH_3N_2H_3 \cdot B_5H_9$, and in ethyl ether is bis-methylhydrazine pentaborane(9), $2CH_3N_2H_3 \cdot B_5H_9$.

The modification of the physical properties of the products by change in the proportion of the hydrazine used is dramatically illustrated by the reaction of pentaborane(9) and hydrazine. The hydrazine pentaborane(9) compound, as prepared in the above example, is a solid. When 5.82 mmol. of pentaborane(9) and 17.8 mmol. of hydrazine were reacted in 14 ml. of benzene at room temperature for seventy-four hours, a white paste, insoluble in benzene was formed. This paste is tris-hydrazine pentaborane(9) $3N_2H_4 \cdot B_5H_9$. And when 5.14 mmol. of pentaborane(9) and 20.2 mmol. of hydrazine were reacted in the same manner, tetrakis-hydrazine pentaborane(9) $4N_2H_4 \cdot B_5H_9$ was formed. This compound is a colorless, nonvolatile liquid product immiscible with benzene.

Monomethylhydrazine forms a similar series of products with pentaborane(9), but the primary solid addition product when using hydrocarbon solvents is $$3CH_3N_2H_3 \cdot B_5H_9$$

Thus when 5.45 mmole of pentaborane(9) and 16.4 mmole of monomethylhydrazine were contacted in benzene at room temperature for twenty-one hours, a white pliable taffy-like solid of the composition $$3CH_3N_2H_3 \cdot B_5H_9$$

was formed. If an amount of pentaborane(9) in excess of 1 mole for each three mols of monomethylhydrazine was used, such excess was recovered unreacted. When excess monomethylhydrazine was used liquid products more dense than benzene were obtained, e.g., $$4CH_3N_2H_3 \cdot B_5H_9$$

is viscous colorless liquid and $5CH_3N_2H_3 \cdot B_5H_9$ a less viscous colorless liquid. The liquid products can also be obtained by adding a hydrazine constituent to the $$3CH_3N_2H_4 \cdot B_5H_9$$

adduct. When monomethylhydrazine and excess pentaborane(9) are reacted in a weak Lewis base solvent such as ethyl ether, a different primary solid addition product, $2CH_3N_2H_3 \cdot B_5H_9$, is obtained. Additional hydrazine constituent will similarly combine with this adduct to form a series of compounds.

The reaction of hydrazine and substituted hydrazines with etherborane coordination compounds such as tetrahydropyran-triborane(7) displaces the coordinating ether and results in the formation of an adduct from the hydrazine constituent and the borane fragment. Thus for example, 21.8 mmoles of $C_4H_8O \cdot B_3H_7$ and 24 mmoles of unsym-dimethylhydrazine were contacted at −23° C. for two and one-half hours. The reaction mixture was warmed to room temperature and subjected to a vacuum. Substantially all the tetrahydropyran charged as $$C_4H_8O \cdot B_3H_7$$

was distilled from the mixture. The residue was colorless, non-volatile, viscous liquid with an empirical formula unsym-$(CH_3)_2N_2H_2 \cdot B_3H_7$. $CH_3N_2H_3 \cdot B_3H_7$ and $$sym-(CH_3)_2N_2H_2 \cdot B_3H_7$$

were prepared in the same manner.

The following examples are further illustrative of the practice of this invention.

2.85 mmoles of monomethylhydrazine and 2.85 mmoles of tetraborane(10) were contacted at −23° C. for one and one-half hours, and the reaction mixture was then warmed slowly to room temperature. The reaction product was a colorless, non-volatile, viscous liquid of composition $CH_3N_2H_3 \cdot B_4H_{10}$. Products varying in composition from sym$(CH_3)_2N_2H_2 \cdot 2B_4H_{10}$ to $$2sym(CH_3)_2N_2H_2 \cdot B_4H_{10}$$

and unsym$(CH_3)_2N_2H_2 \cdot 2B_4H_{10}$ to $$2unsym(CH_3)_2N_2H_2 \cdot B_4H_{10}$$

were obtained from similar reactions of tetraborane(10) and the appropriate hydrazine. These products are colorless, non-volatile liquids similar to the $CH_3N_2H_3 \cdot B_4H_{10}$ compounds.

10.5 mmols of hydrazine was added to a solution of 3.3 mmols of decaborane in 7 ml. of toluene at room temperature for two hours. The solid addition product melts at 40–45° C. and has a composition $3N_2H_4 \cdot B_{10}H_{14}$. Similarly 5.7 mmols of hydrazine and 4.6 mmols of decaborane were contacted for seventy hours in 10 ml. of ethyl ether. The solvent and 1.14 mmols of unreacted hydrazine were removed under vacuum, leaving a white crystalline solid product of composition $N_2H_4 \cdot B_{10}H_{14}$. The product did not melt even at 200° C. In another reaction, 7.4 mmols of phenylhydrazine and 7.4 mmols of decaborane were reacted for 16 hours in 10 ml. of toluene. The product $C_6H_5N_2H_3 \cdot B_{10}H_{14}$ softened with some decomposition at 120–190° C.

The reaction of equimolar proportion of monomethylhydrazine and decaborane in ethyl ether produced a stable, white, crystalline solid material of composition $$CH_3N_2H_3 \cdot B_{10}H_{14}$$

The physical nature of the compound, infra red and mass spectrum analysis, and chemical analysis, indicate that this product is a hydrazinum salt, $$CH_3N_2H_4^+ B_{10}H_{13}^-$$

The monomethylhydrazine solvate of this salt, $$CH_3N_2H_4^+ B_{10}H_{13}^- \cdot CH_3N_2H_3^-$$

is a solid crystalline material similar to the unsolvated salt. The addition of another mole of methylhydrazine to the solvated salt produces a soft, pliable characteristically polymeric material which exhibits thermoplastic qualities, and melts to a viscous liquid in the range 60–80° C. This material is soluble in aromatic hydrocarbons, such as benzene and toluene.

Other salts may be solvated with hydrazines. For example, 12.4 mmols dimethylammonium tridecahydrodecaborate, $(CH_3)_2NH_2^+B_{10}H_{13}^-$ was contacted with 25.2 mmols of methylhydrazine in 10 ml. of ethyl ether for eighty hours. The product of composition $$(CH_3)_2NH_2 \cdot B_{10}H_{13} \cdot 2CH_3N_2H_3$$

was a soft powder which coagulated into a pliable mass.

Equimolar amounts of bisacetonitrilodecarborane and hydrazine were maintained at room temperature in pentane for nineteen hours. The addition product formed thereby was a white, high melting solid. Similar products were obtained from the equimolar reaction of methylhydrazine in benzene, acetonitrile, and ethyl ether. When in excess of three mols of methylhydrazine were used for each mol of bisactonitrilodecaborane, the product was a slightly shock sensitive grey-white, pliable paste.

5.2 mmols of dimethylformamidodecaborane and 15.9 mmols of methylhydrazine were contacted at room temperature in 10 ml. ethyl ether for five hours. The product was a soft, amorphous gum.

1.64 grams of methyldecaboranes $B_{10}H_{14-x}R_x$ were contacted at room temperature in 10 ml. of toluene with 35.6 mmols of methylhydrazine for three hours at room temperature. The reaction product was a thick milky grease which liquified at 35–70° C. This material polymerized to a brittle glass resin when heated to 150° C. and cooled.

Isopropenylacetylenedecaborane, prepared by reaction of isopropenylacetylene and bisacetonitrilodecaborane, was similarly reacted with varying proportions of methylhydrazine in ethyl ether. Products containing one to two mols of methylhydrazine for each mol of decaborane derivative were soft, pliable, yellow and plastic. As the ratio of methylhydrazine was increased, the products became viscous liquids. A product containing 5 methylhydrazines for each isopropenylacetylenedacaborane was a yellow syrup which had a vapor pressure at 25° C. of less than $10^{-2}$ mm. of Hg. Similar liquid products were obtained from reactions using isopropylacetylenedecaborane.

The reaction of methylhydrazine and tribromomethylacetylenedecaborane in ethyl ether produced a light brown adhesive gum of the composition $$2CH_3N_2H_3 \cdot BrC_3H_3B_{10}H_{10}$$

The new compounds of this invention are useful as chemical intermediates and polymerization catalysts. The compounds have a high heat of combustion and are useful as high energy fuels. For example, the heat of combustion of $3CH_3N_2H_3 \cdot B_{10}H_{14}$ is 23,400 B.t.u./lb. as compared to 18,400 B.t.u./lb. for JP–4. The liquid compounds are especially suited for use in liquid bipropellant systems because of their stability, high density, and low volatility, and the ease with which physical properties may be tailored to meet engine requirements by the mere change of proportion of the hydrazine constituent. These high energy fuels burn readily with conventional oxidizers, including air and oxygen, and are primarily useful in turbojet, ramjet, and rocket engines. In actual tests the liquid fuels are used as follows: a sample of the fuel is introduced into the combustion section of a jet test engine, burned with compressed air, and the efficiency of the combustion and output of the engine measured. When these fuels were burned in a test engine the thrust per unit weight of fuel was substantially greater than the thrust obtained using the best hydrocarbon fuels. Thus an aircraft using a high energy hydrazine boron fuel can travel proportionately further with the same load or can carry proportionately greater loads than when fueled with conventional fuels.

The compounds of this invention have a high internal energy and may be used as monopropellants if desired. The compounds decompose at high temperatures with the release of energy to form hydrogen, boron nitride, and boron carbide. This reaction is self sustaining at high temperatures, and can be initiated by ignition with a spark discharge or by use of a chemical oxidizer. The new solid and plastic compounds of this invention are useful as solid monopropellants or as fuel components in solid monopropellants when compounded with conventional oxidizers and binders.

According to the provisions of the patent statutes, we have explained the principle and mode of practicing our invention, and have described what we now consider to be its best embodiments. However, we desire to have it understood that within the scope of the appended claims, the invention may be practiced otherwise than as specifically described.

We claim:
1. An addition compound of hydrazine and a borane selected from the group consisting of $N_2H_4 \cdot B_4H_{10}$, $N_2H_4 \cdot B_{10}H_{14}$, $3N_2H_4 \cdot B_{10}H_{14}$, $N_2H_4 \cdot B_5H_9$, $3N_2H_4 \cdot B_5H_9$ and $4N_2H_4 \cdot B_5H_9$.
2. A compound $N_2H_4 \cdot B_4H_{10}$.
3. A compound $N_2H_4 \cdot B_{10}H_{14}$.
4. A compound $3N_2H_4 \cdot B_{10}H_{14}$.
5. A compound $N_2H_4 \cdot B_5H_9$.
6. A compound $3N_2H_4 \cdot B_5H_9$.
7. A compound $4N_2H_4 \cdot B_5H_9$.

References Cited by the Examiner

Carpenter, "A.R.S. Journal," vol. 29, No. 1, pp. 8, 10 and 11. (January 1959).

Emeleus, et al.: Modern Aspects of Inorganic Chemistry, pp. 273–281 (1958).

Gmelin, "Handbuch der anorganischen chemie," vol. 13, p. 167 (1954).

Hurd, "Chemistry of the Hydrides," 1952, pp. 84, 157 and 158.

Steindler et al.: "J. Amer. Chem. Soc.," vol. 75, p. 756 (1943).

Stock et al.: "Berichte," vol. 65b, pp. 1718–1724 (1932).

OSCAR R. VERTIZ, *Primary Examiner.*

ROGER L. CAMPBELL, MAURICE A. BRINDISI, *Examiners.*

E. C. THOMAS, C. D. QUARFORTH, R. D. MORRIS, M. WEISSMAN, *Assistant Examiners.*